United States Patent
Shimada et al.

(10) Patent No.: US 6,649,302 B2
(45) Date of Patent: Nov. 18, 2003

(54) TEMPERATURE SENSING DEVICE FOR USE IN SECONDARY BATTERY PACK, AND SECONDARY BATTERY PACK INCORPORATING THE SAME

(75) Inventors: Minoru Shimada, Yokaichi (JP); Takayo Katsuki, Shiga-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 238 days.

(21) Appl. No.: 09/863,133

(22) Filed: May 23, 2001

(65) Prior Publication Data
US 2002/0004160 A1 Jan. 10, 2002

(30) Foreign Application Priority Data
May 23, 2000 (JP) ......................................... 2000-151755

(51) Int. Cl.[7] ........................ H01M 2/00; H01M 10/50; H02J 7/04; H02J 7/16; H02J 7/00
(52) U.S. Cl. ........................... 429/62; 429/61; 320/154; 320/160; 320/162
(58) Field of Search ...................... 429/62, 61; 320/162, 320/160, 116, 154

(56) References Cited
U.S. PATENT DOCUMENTS 4,860,185 A * 8/1989 Brewer et al. ............... 363/41
5,125,112 A * 6/1992 Pace et al. .................. 455/343
5,396,163 A * 3/1995 Nor et al. .................... 320/159
5,744,936 A * 4/1998 Kawakami .................. 320/120
5,900,717 A * 5/1999 Lee ............................. 320/150
6,268,714 B1 * 7/2001 Yang ........................... 320/150
6,313,605 B1 * 11/2001 Tsenter ........................ 320/125
6,524,738 B1 * 2/2003 Lee et al. ...................... 429/59

FOREIGN PATENT DOCUMENTS

| JP | 7-226194 | 8/1995 |
| JP | 8-098422 | 4/1996 |
| JP | 11-242966 | 9/1999 |

* cited by examiner

Primary Examiner—Randy Gulakowski
Assistant Examiner—Donald V. Scaltrito
(74) Attorney, Agent, or Firm—Keating & Bennett, LLP

(57) ABSTRACT

A temperature sensing device for use in a secondary battery pack includes an NTC element and a current limiter element. The NTC element is disposed at a predetermined position to sense the temperature of a secondary battery incorporated in the secondary battery pack, and one end thereof is electrically connected to a temperature sensing terminal. The current limiter element is connected between the other end of the NTC element and a reference potential terminal.

20 Claims, 3 Drawing Sheets

TEMPERATURE SENSING DEVICE FOR USE IN SECONDARY BATTERY PACK, AND SECONDARY BATTERY PACK INCORPORATING THE SAME

BACKGROUND OF THE INVENTION

1. Field of the Invention

The present invention generally relates to temperature sensing devices for use in secondary battery packs that include secondary batteries such as lithium ion batteries, and to the secondary battery packs incorporating such temperature sensing devices. More specifically, the present invention relates to an improved temperature sensing device for use in a secondary battery pack, which uses an NTC element (i.e., a negative temperature coefficient thermistor), and to the secondary battery pack incorporating such a temperature sensing device.

2. Description of the Related Art

Conventionally, secondary battery packs have been commonly used as power supplies for use in, for example, mobile communication apparatuses.

FIG. 6 is a block circuit diagram of a conventional secondary battery pack. Referring to FIG. 6, the conventional secondary battery pack includes a secondary battery 24, a hot-side terminal 21 and a reference potential terminal 22 for recharging the secondary battery 24, and a temperature sensing terminal 23 for sensing the temperature of the secondary battery 24. The positive electrode of the secondary battery 24 is electrically connected to the hot-side terminal 21 and the negative electrode of the secondary battery 24 is electrically connected to the reference potential terminal 22. The secondary battery pack also includes FETs 25 and 26, and a controller IC 27 in order to control the operation of the secondary battery 24.

The secondary battery pack further includes an NTC element 28 for sensing the temperature of the secondary battery 24, which is connected between the temperature sensing terminal 23 and the reference potential terminal 22. The NTC element 28 is disposed in proximity to the secondary battery 24 so as to allow for sensing of the temperature of the secondary battery 24. The secondary battery 24 is recharged by a battery charger in accordance with an output from the temperature sensing terminal 23, i.e., in accordance with the temperature of the secondary battery 24.

With the ever decreasing size of electronic apparatuses which incorporate secondary battery packs, such as cellular phones, the secondary battery packs are also becoming smaller in size. Thus, in the secondary battery pack described above, the hot-side terminal 21, the reference potential terminal 22, and the temperature sensing terminal 23 are disposed in proximity to one another. As a result, for example, if the secondary battery pack is put into a clothes pocket when a metallic piece such as a hairpin happens to be in the clothes pocket, the hot-side terminal 21 and the temperature sensing terminal 23 are often short-circuited due to contact with the metallic piece. When such a short-circuit occurs, a terminal voltage of the secondary battery 24 is applied to the NTC element 28. Thus, a short-circuit current flows into the NTC element 28, which sometimes causes burnout of the NTC element 28.

SUMMARY OF THE INVENTION

In order to overcome the problems described above, preferred embodiments of the present invention provide a temperature sensing device for use in a secondary battery pack, and the secondary battery pack incorporating the temperature sensing device, in which an NTC element incorporated therein is unsusceptible to short-circuiting and burnout, and reliability is thus greatly improved.

According to a preferred embodiment of the present invention, a temperature sensing device for sensing the temperature of a secondary battery in a secondary battery pack includes an NTC (negative temperature coefficient) element disposed at a predetermined position for sensing the temperature of the secondary battery, one end thereof being electrically connected to a temperature sensing terminal, and a current limiter element connected between the other end of the NTC element and a reference potential.

In the temperature sensing device, the current limiter element is preferably a PTC (positive temperature coefficient) element.

According to another preferred embodiment of the present invention, a secondary battery pack includes a secondary battery, a hot-side terminal and a reference potential terminal for recharging the secondary battery, a temperature sensing terminal for sensing the temperature of the secondary battery, an NTC element arranged to sense the temperature of the secondary battery, one end thereof being electrically connected to the temperature sensing terminal, and a current limiter element connected between the other end of the NTC element and the reference potential terminal.

In the secondary battery pack, the current limiter element is preferably a PTC element.

In the temperature sensing device and the secondary battery pack according to preferred embodiments of the present invention, because the current limiter element is connected between the NTC element and the reference potential, even if the temperature sensing terminal and the hot-side terminal of the secondary battery pack are short-circuited, the current limiter element prevents an overcurrent from continuously flowing into the NTC element, thereby preventing burnout of the NTC element.

Furthermore, when the PTC element is used as the current limiter element, when an application of voltage is stopped after the overcurrent is blocked by the PTC element, the resistance value of the NTC element returns to its initial value, allowing repeated protective operations in case of short circuits.

Other features, elements, characteristics and advantages of the present invention will become apparent from the following detailed description of preferred embodiments with reference to the attached drawings.

DETAILED DESCRIPTION OF PREFERRED EMBODIMENTS

Temperature sensing devices for use in secondary battery packs, and the secondary battery packs incorporating the temperature sensing devices, according to preferred embodiments of the present invention, will now be described with reference to the accompanying drawings.

Figure 1:
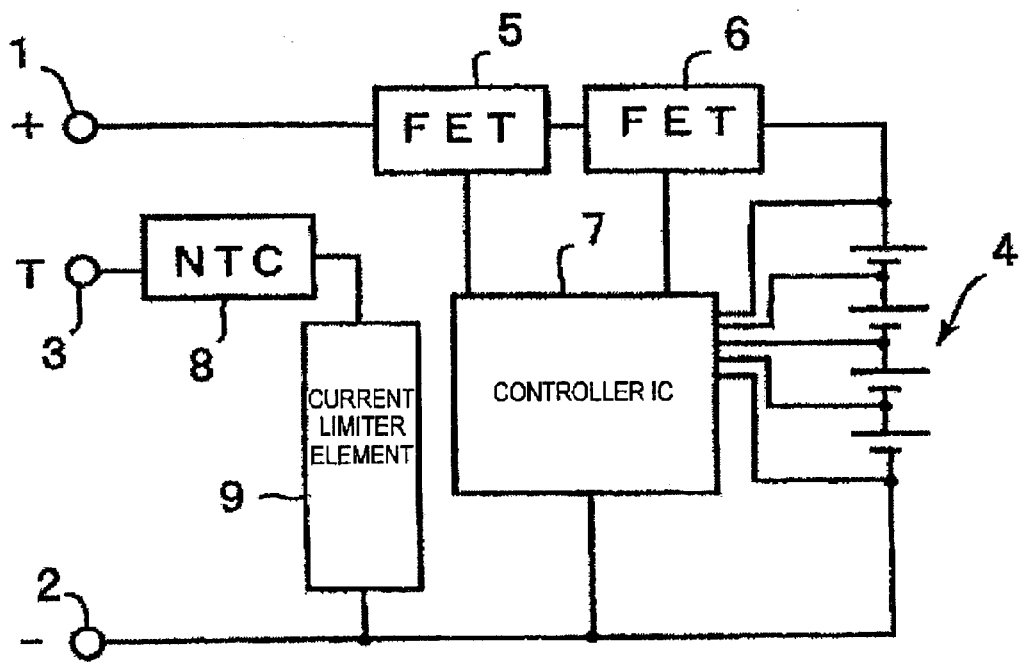
FIG. 1 is a block circuit diagram of a secondary battery pack according to a first preferred embodiment of the present invention.

FIG. 1 is a block circuit diagram of a secondary battery pack according to a first preferred embodiment of the present invention. The secondary battery pack according to the first preferred embodiment preferably includes a hot-side terminal 1, a reference potential terminal 2, a temperature sensing terminal 3, and a secondary battery 4 connected between the hot-side terminal 1 and the reference potential terminal 2. The secondary battery pack also includes FETs 5 and 6, and a controller IC 7 for controlling the secondary battery 4.

The secondary battery pack further includes an NTC element 8 arranged to sense the temperature of the secondary battery 4, the NTC element 8 being provided physically in proximity to the secondary battery 4. One end of the NTC element 8 is electrically connected to the temperature sensing terminal 3.

Figure 3:
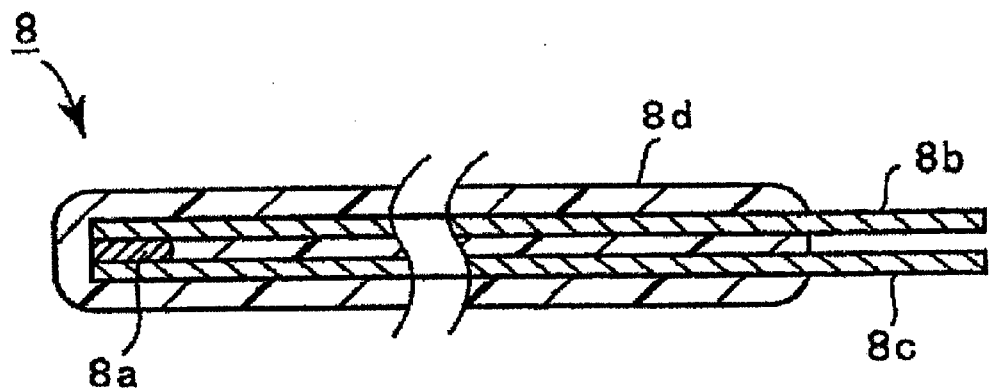
FIG. 3 is a sectional view of an example of a NTC element incorporated in the first and second preferred embodiments of the present invention.

The construction of the NTC element 8 is shown in FIG. 3 by way of example, although it is not limited thereto. The NTC element 8 shown in FIG. 3 includes a thin-plate, a semiconductive ceramic member 8a having a negative temperature coefficient, lead terminals 8b and 8c connected to both surfaces of the semiconductive ceramic member 8a, and an insulating film 8d composed of, for example, polyimide or other suitable material, covering the semiconductive ceramic member 8a and the lead terminals 8b and 8c except extracted portions of the lead terminals 8b and 8c. Because of the thin-plate structure of the semiconductive ceramic member 8a, the NTC element 8 has a very thin overall structure.

Thus, the NTC element 8 is able to be readily disposed in proximity to the secondary battery 4, which allows the secondary battery pack to have a very small size.

The secondary battery pack further includes a current limiter element 9, one end thereof being connected to the other end of the NTC element 8, and the other end thereof being connected to the reference potential terminal 2. The current limiter element 9 includes, for example, a current fuse or a fuse resistor.

In the secondary battery pack in this preferred embodiment, a temperature sensing device is implemented by the NTC element 8 and the current limiter element 9 connected in series. Thus, in case the hot-side terminal 1 and the temperature sensing terminal 3 get short-circuited, the current limiter element 9 blocks an overcurrent from flowing into the NTC element 8, thereby preventing burnout of the NTC element 8.

More specifically, if a metallic piece such as a hairpin contacts the secondary battery pack, short-circuiting the hot-side terminal 1 and the temperature sensing terminal 3, a terminal voltage of the secondary battery 4 will be applied to the NTC element 8 and the current limiter element 9. In this case as well, the current limiter element 9 prevents an overcurrent from flowing into the NTC element 8.

If a current fuse or a fuse resistor is used as the current limiter element 9, the current fuse or the fuse resistor fuses in response to a terminal voltage of the secondary battery 4. Thus, current is prevented from flowing into the NTC element 8, thus preventing burnout of the NTC element 8.

Figure 2:
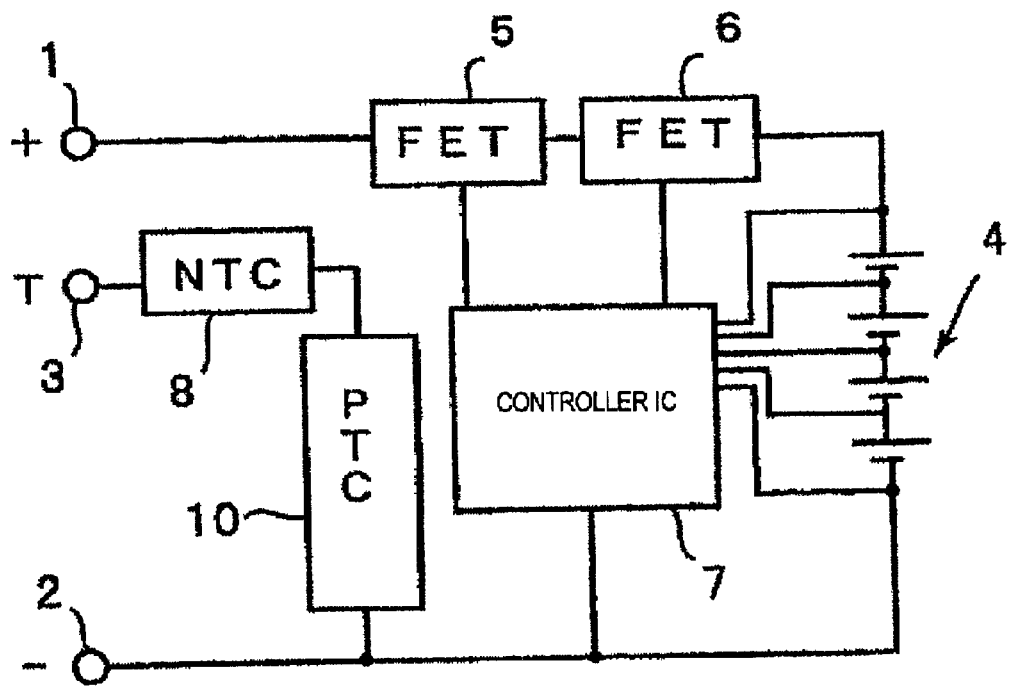
FIG. 2 is a block circuit diagram of a secondary battery pack according to a second preferred embodiment of the present invention.

FIG. 2 is a block circuit diagram of a secondary battery pack according to a second preferred embodiment of the present invention, which is preferred to the first preferred embodiment.

The secondary battery pack according to the second preferred embodiment includes, instead of the current limiter element 9 as included in the first preferred embodiment, a different type of current limiter element, more specifically, a PTC (positive temperature coefficient) element 10. The secondary battery pack according to the second preferred embodiment is otherwise preferably the same as the secondary battery pack according to the first preferred embodiment of the present invention.

Figure 4:
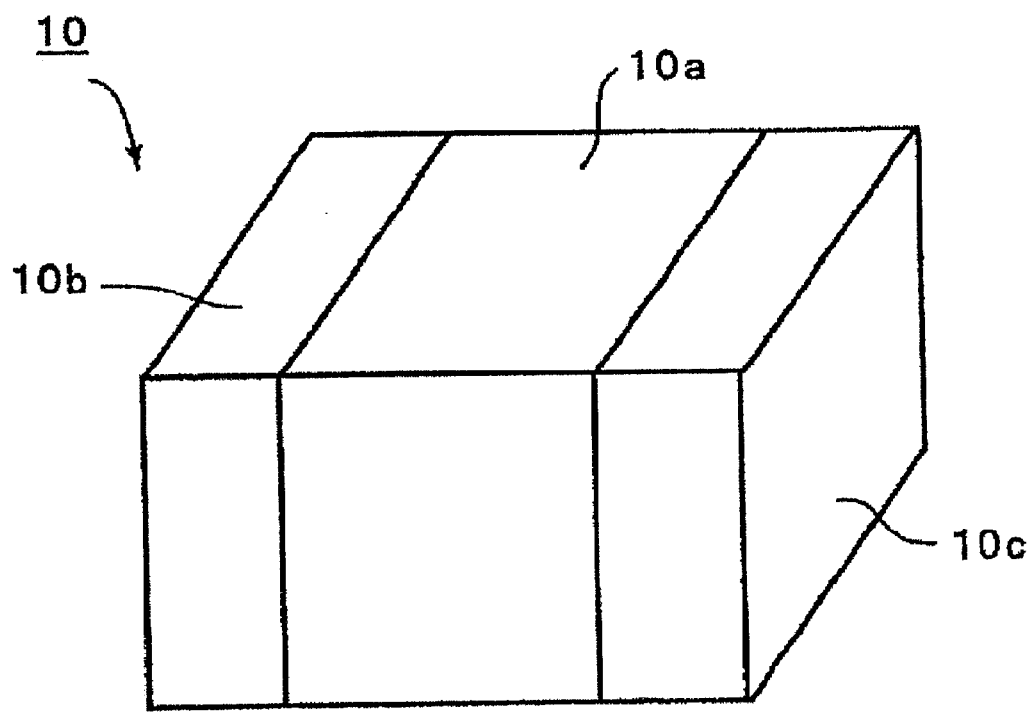
FIG. 4 is a perspective view of an example of a PTC element incorporated in the second preferred embodiment of the present invention.

The construction of the PTC element 10 is shown in FIG. 4, which is a chip-type PTC element, although it is not limited thereto. The PTC element shown in FIG. 4 preferably includes a substantially rectangular-plate, a semiconductive ceramic member 10a having a positive temperature coefficient, and external electrodes 10b and 10c covering the sides of the semiconductive ceramic member 10a. Because the PTC element is constructed to define a chip-type component, the PTC element 10 can be surface-mounted on a substrate on which a control circuitry of a small secondary battery pack is disposed.

In the second preferred embodiment, similarly as in the first preferred embodiment, if the hot-side terminal 1 and the temperature sensing terminal 3 become short-circuited due to, for example, a metallic piece is placed therebetween, a terminal voltage of the secondary battery 4 is applied to the NTC element 8 and the PTC element 10. When this happens, the value of resistance of the PTC element 10 rapidly increases so as to inhibit an overcurrent from flowing into the NTC element 8, thereby preventing burnout of the NTC element 8.

The second preferred embodiment is more preferred to the first preferred embodiment in that because the current limiter element is implemented by a PTC element 10, the temperature sensing device has restorability, i.e., it allows continuous protecting operations.

Preferably, the value of resistance of the PTC element 10 at room temperature is not greater than about 10% of that of the NTC element 8, in order to minimize the effect on the temperature characteristics of the NTC element 8. If the value of resistance of the PTC element 10 at room temperature is too low, however, the protecting operation does not work until the current becomes extremely large.

Figure 5:
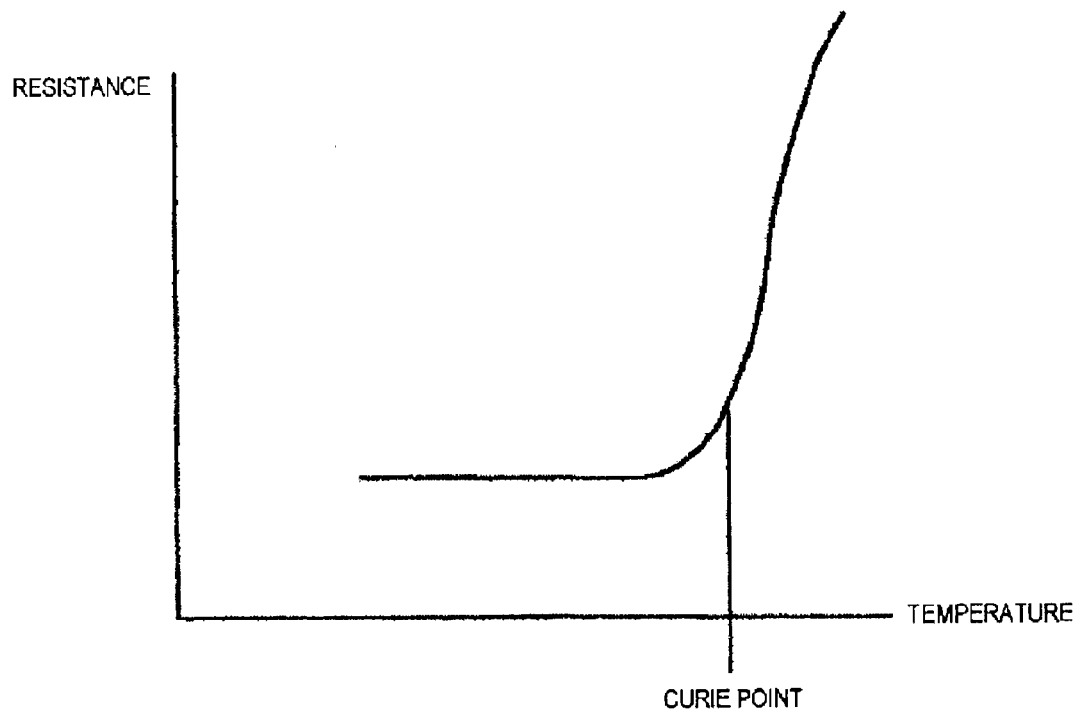
FIG. 5 is a graph showing a relationship between temperature and resistance in the PTC element shown in FIG. 4.
Figure 6:
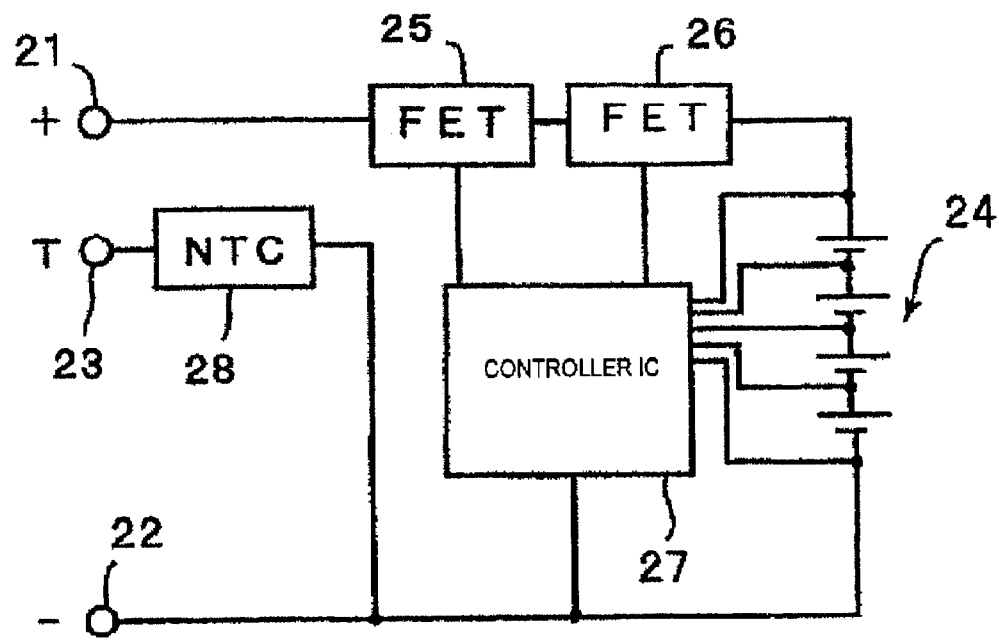
FIG. 6 is a block circuit diagram of a conventional secondary battery pack.

The upper limit of the temperature which can be sensed by the NTC element 8 incorporated in the secondary battery pack is usually on the order of about 85° C. Thus, referring to FIG. 5, the PTC element is preferably selected so that the Curie point thereof is above about 85° C., more preferably, within a range of about 90° C. to about 140° C.

The below describes results of an experiment relating to preferred embodiments of the present invention.

In the secondary battery pack incorporating the secondary battery 4, which is a lithium ion battery with a terminal voltage of 12 V, the temperature sensing device was implemented using the NTC element 8 and the PTC element 10. The NTC element 8 was of the type having a resistance value of about 10 kΩ at a temperature of approximately 25° C., and the PTC element was of the type having approximate dimensions of 1.6 mm×0.8 mm×0.8 mm, a resistance value of about 30 Ω to about 500 Ω at a temperature of about 25° C., and a Curie point of approximately 100° C.

When a DC voltage of about 12 V was directly applied to the NTC element 8, the NTC element 8 burned out in several seconds.

Meanwhile, when a DC voltage of 12 V was applied to both ends of the circuit in which the NTC element 8 and the PTC element 10 was connected in series, the PTC element 10 sensed an overcurrent and thus reduced the amount of current, preventing the NTC element 8 from a thermal runaway and thereby preventing burnout of the NTC element. When the application of the voltage was stopped, it was observed that the resistance value of the NTC element at a temperature of about 25° C. returned to 10 kΩ.

As is apparent from the results of the experiment, by incorporating the PTC element 10 as the current limiter element, the NTC element 8 in the secondary battery pack can be continuously protected from burnout.

While preferred embodiments have been described above, it is to be understood that modifications and changes will be apparent to those skilled in the art without departing from the spirit of the invention. The scope of the present invention is therefore to be determined solely by the appended claims.

What is claimed is:

1. A temperature sensing device for sensing the temperature of a secondary battery in a secondary battery pack, said temperature sensing device comprising:
    a negative temperature coefficient element disposed at a predetermined position to sense the temperature of the secondary battery, a first end of the negative temperature coefficient element being electrically connected to a temperature sensing terminal; and
    a current limiter element connected between a second end of said negative temperature coefficient element and a reference potential.

2. A temperature sensing device according to claim 1, wherein said current limiter element is a positive temperature coefficient element.

3. A temperature sensing device according to claim 2, wherein said positive temperature coefficient element is a chip type component.

4. A temperature sensing device according to claim 2, wherein said positive temperature coefficient element includes a substantially rectangular-plate, a semiconductive ceramic member having a positive temperature coefficient, and external electrodes covering the sides of the semiconductive ceramic member.

5. A temperature sensing device according to claim 2, wherein the value of resistance of the positive temperature coefficient element at room temperature is not greater than about 10% of that of the negative temperature coefficient element.

6. A temperature sensing device according to claim 2, wherein the Curie point of the positive temperature coefficient is above about 85° C.

7. A temperature sensing device according to claim 2, wherein the Curie point of the positive temperature coefficient is within a range of about 90° C. to about 140° C.

8. A temperature sensing device according to claim 1, wherein the negative temperature coefficient element includes a thin-plate, a semiconductive ceramic member having a negative temperature coefficient, lead terminals connected to both surfaces of the semiconductive ceramic member, and an insulating film covering the semiconductive ceramic member and the lead terminals except extracted portions of the lead terminals.

9. A temperature sensing device according to claim 1, wherein the current limiter element includes at least one of a current fuse and a fuse resistor.

10. A temperature sensing device according to claim 1, wherein the negative temperature coefficient element and the current limiter element are connected in series.

11. A secondary battery pack comprising:
    a secondary battery;
    a hot-side terminal and a reference potential terminal arranged to recharge said secondary battery;
    a temperature sensing terminal arranged to sense the temperature of said secondary battery;
    a negative temperature coefficient element disposed to sense the temperature of said secondary battery, a first end of said negative temperature coefficient element being electrically connected to said temperature sensing terminal; and
    a current limiter element connected between a second end of said negative temperature coefficient element and said reference potential terminal.

12. A secondary battery pack according to claim 11, wherein said current limiter element is a positive temperature coefficient element.

13. A secondary battery pack according to claim 12, wherein said positive temperature coefficient element is a chip type component.

14. A secondary battery pack according to claim 12, wherein said positive temperature coefficient element includes a substantially rectangular-plate, a semiconductive ceramic member having a positive temperature coefficient, and external electrodes covering the sides of the semiconductive ceramic member.

15. A secondary battery pack according to claim 12, wherein the value of resistance of the positive temperature coefficient element at room temperature is not greater than about 10% of that of the negative temperature coefficient element.

16. A secondary battery pack according to claim 12, wherein the Curie point of the positive temperature coefficient is above about 85° C.

17. A secondary battery pack according to claim 12, wherein the Curie point of the positive temperature coefficient is within a range of about 90° C. to about 140° C.

18. A secondary battery pack according to claim 11, wherein the negative temperature coefficient element includes a thin-plate, a semiconductive ceramic member having a negative temperature coefficient, lead terminals connected to both surfaces of the semiconductive ceramic member, and an insulating film covering the semiconductive ceramic member and the lead terminals except extracted portions of the lead terminals.

19. A secondary battery pack according to claim 11, wherein the current limiter element includes at least one of a current fuse and a fuse resistor.

20. A secondary battery pack according to claim 11, wherein the negative temperature coefficient element and the current limiter element are connected in series.

* * * * *